(12) United States Patent
Ishibashi et al.

(10) Patent No.: US 8,855,286 B2
(45) Date of Patent: Oct. 7, 2014

(54) AUDIO CONFERENCE DEVICE

(71) Applicant: Yamaha Corporation, Hamamatsu (JP)

(72) Inventors: Toshiaki Ishibashi, Fukuroi (JP); Chikara Kobayashi, Hamamatsu (JP); Kazumasa Suzuki, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 14/052,382

(22) Filed: Oct. 11, 2013

(65) Prior Publication Data

US 2014/0037081 A1 Feb. 6, 2014

Related U.S. Application Data

(63) Continuation of application No. 12/088,239, filed as application No. PCT/JP2006/321249 on Oct. 25, 2006, now Pat. No. 8,565,464.

(30) Foreign Application Priority Data

Oct. 27, 2005 (JP) .................................. 2005-312964

(51) Int. Cl.
*H04M 1/60* (2006.01)
*H04R 1/40* (2006.01)
*H04M 3/56* (2006.01)
*H04R 1/02* (2006.01)
*H04R 1/34* (2006.01)
*H04R 29/00* (2006.01)

(52) U.S. Cl.
CPC ....... *H04M 1/6033* (2013.01); *H04R 2201/403* (2013.01); *H04R 1/403* (2013.01); *H04R 1/406* (2013.01); *H04R 1/026* (2013.01); *H04R 1/345* (2013.01); *H04R 29/008* (2013.01); *H04M 3/56* (2013.01)

USPC .................. 379/202.01; 381/117; 381/307

(58) Field of Classification Search
USPC .................................................. 381/117, 307
See application file for complete search history.

(56) References Cited

U.S. PATENT DOCUMENTS

| 4,266,092 A | 5/1981 | Barker, III |
|---|---|---|
| 4,378,468 A | 3/1983 | Braun |

(Continued)

FOREIGN PATENT DOCUMENTS

| CN | 1290467 A | 4/2001 |
|---|---|---|
| EP | 1 117 076 A2 | 7/2001 |

(Continued)

OTHER PUBLICATIONS

"One Body Real 5.1 Surround" Digital sound projector, YSP-1 Catalogue, Yamaha Corportation Dec. 2004.

(Continued)

*Primary Examiner* — David Vu
*Assistant Examiner* — Jonathan Han
(74) *Attorney, Agent, or Firm* — Rossi, Kimms & McDowell LLP (57) ABSTRACT

An audio conference device receives and emits sounds to perform transmission/reception of audio signals via communications. The device has a speaker array with a plurality of speakers arranged on the lower surface of an elongated main housing, and a microphone array with a plurality of microphones arranged on the side surface of the main housing along the longitudinal direction. Legs are attached to the main body to support the main housing at a prescribed height above the resting surface and to secure good sound emission characteristics of the speaker array. The device further controls directivity of the microphones.

7 Claims, 6 Drawing Sheets

(56) References Cited

U.S. PATENT DOCUMENTS

| | | | |
|---|---|---|---|
| 5,222,145 A | 6/1993 | Draffen | |
| 5,524,059 A | 6/1996 | Zurcher | |
| 5,546,468 A | 8/1996 | Beard | |
| 5,657,393 A | 8/1997 | Crow | |
| 5,848,170 A | 12/1998 | Mahieux et al. | |
| 5,905,947 A | 5/1999 | Stein | |
| 6,084,973 A | 7/2000 | Green et al. | |
| 6,148,089 A | 11/2000 | Akino | |
| 6,173,059 B1 | 1/2001 | Huang et al. | |
| 6,279,678 B1 | 8/2001 | Tracy | |
| 6,494,363 B1 | 12/2002 | Roger et al. | |
| 6,628,767 B1* | 9/2003 | Wellner et al. | 379/202.01 |
| 6,868,045 B1 | 3/2005 | Schroder | |
| 2002/0140804 A1 | 10/2002 | Colmenarez et al. | |
| 2003/0059061 A1 | 3/2003 | Tsuji et al. | |
| 2003/0185414 A1 | 10/2003 | Liu | |
| 2004/0041902 A1 | 3/2004 | Washington | |
| 2004/0246607 A1 | 12/2004 | Watson et al. | |
| 2005/0008173 A1 | 1/2005 | Suzuki et al. | |
| 2005/0149320 A1* | 7/2005 | Kajala et al. | 704/206 |
| 2005/0153716 A1* | 7/2005 | Bodley | 455/463 |
| 2005/0175190 A1 | 8/2005 | Tashev et al. | |
| 2005/0201582 A1 | 9/2005 | Hughes, II et al. | |
| 2005/0207566 A1 | 9/2005 | Ohki et al. | |
| 2005/0231587 A1* | 10/2005 | Root et al. | 348/14.07 |
| 2005/0238196 A1* | 10/2005 | Furuno et al. | 381/386 |
| 2006/0204022 A1 | 9/2006 | Hooley et al. | |
| 2008/0260178 A1 | 10/2008 | Tanaka | |
| 2009/0041283 A1 | 2/2009 | Ishibashi et al. | |
| 2009/0252364 A1 | 10/2009 | Saito et al. | |
| 2013/0039504 A1 | 2/2013 | Pandy et al. | |

FOREIGN PATENT DOCUMENTS

| | | |
|---|---|---|
| EP | 1 942 700 A1 | 7/2008 |
| EP | 1 942 700 A1 | 9/2008 |
| JP | 58-056563 A | 4/1983 |
| JP | 59069800 A | 4/1984 |
| JP | 59-180139 A | 10/1984 |
| JP | 59-181969 A | 10/1984 |
| JP | 02-086397 A | 3/1990 |
| JP | 02-114799 A | 4/1990 |
| JP | 03-136557 A | 6/1991 |
| JP | 04-318798 A | 11/1992 |
| JP | 05-091588 A | 4/1993 |
| JP | 10023121 A | 1/1998 |
| JP | 2000032584 A | 1/2000 |
| JP | 2000-324233 A | 11/2000 |
| JP | 2000-354290 A | 12/2000 |
| JP | 3274470 B2 | 4/2002 |
| JP | 2003-087887 A | 3/2003 |
| JP | 2004-165775 A | 6/2004 |
| JP | 2004343700 A | 12/2004 |
| JP | 2005-229433 A | 8/2005 |
| WO | 96/32804 A1 | 10/1996 |
| WO | 03/037034 A1 | 5/2003 |
| WO | 2004/075601 A1 | 9/2004 |

OTHER PUBLICATIONS

Chou, Thomas "Frequencey-Independent Beamformer With Low Response Error" cited in EESR issued in coressponding EP 06822658.8.

Decision of Refusal issued in corresponding JP 200532044 Dated Aug. 23, 2011. Cited in the Parent, U.S. Appl. No. 12/088,239, filed Mar. 26, 2008.

Decision of Refusal issued in corresponding JP 200532045 Dated Aug. 23, 2011. Cited in the Parent, U.S. Appl. No. 12/088,239, filed Mar. 26, 2008.

EESR issued in EP06822658.8. Cited in the Parent, U.S. Appl. No. 12/088,239, filed Mar. 26, 2008.

ISR issued in PCT/JP2006/305196 Dated Jun. 23, 2006. Cited in the Parent, U.S. Appl. No. 12/088,239, filed Mar. 26, 2008.

Notification of Reason for Refusal issued in JP 2005320044. Date drafted Apr. 20, 2011. Cited in the Parent, U.S. Appl. No. 12/088,239, filed Mar. 26, 2008.

Notification of Reason for Refusal issued in JP 2005320045. Cited in the Parent, U.S. Appl. No. 12/088,239, filed Mar. 26, 2008.

Office Action issued in CN200680040868.8 dated Dec. 6, 2011. Cited in the Parent, U.S. Appl. No. 12/088,239, filed Mar. 26, 2008.

Office Action issued in JP2005-320044 Issued Aug. 23, 2011. Cited in the Parent, U.S. Appl. No. 12/088,239, filed Mar. 26, 2008.

Office Action issued in EP 06715687.7 dated Mar. 31, 2011. Cited in the Parent, U.S. Appl. No. 12/088,239, filed Mar. 26, 2008.

Office Action issued in CN200680040868.8 issued Aug. 17, 2011. Cited in the Parent, U.S. Appl. No. 12/088,239, filed Mar. 26, 2008.

Office Action issued in JP2005320045 issued Aug. 23, 2011. Cited in the Parent, U.S. Appl. No. 12/088,239, filed Mar. 26, 2008.

Saito, Kosuke et al. "Voice Signal Transmitting/Receiving Apparatus" Specification and Drawings of U.S. Appl. No. 12/092,352, filed May 1, 2008. Cited in the Parent, U.S. Appl. No. 12/088,239, filed Mar. 26, 2008.

Written Opinion issued in corresponding PCT/JP2006/305196 Dated Jun. 23, 2006. Cited in the Parent, U.S. Appl. No. 12/088,239, filed Mar. 26, 2008.

International Search Report issued in corresponding PCT/JP2006/321729.Cited in the Parent, U.S. Appl. No. 12/088,239, filed Mar. 26, 2008.

Tanaka, Ryo. "Audio Signal Transmission/Reception Device and Microphone Apparatus Thereof" Specification and Drawings of U.S. Appl. No. 12/108,593, filed Apr. 24, 2008. Cited in the Parent, U.S. Appl. No. 12/088,239, filed Mar. 26, 2008.

Extended European Search Report issued Aug. 20, 2012 for EP 06822226.4.Cited in the Parent, U.S. Appl. No. 12/088,239, filed Mar. 26, 2008.

Notification of the First Office Action issued in Chinese Patent Application No. 200680039547.6 dated Dec. 27, 2010. Cited in the Parent, U.S. Appl. No. 12/088,239, filed Mar. 26, 2008.

Notice of Reasons for Refusal stated in Japanese Office Action for JP 2005-312964, mailed Apr. 26, 2011. Cited in the Parent, U.S. Appl. No. 12/088,239, filed Mar. 26, 2008.

Decision of Rejection issued in Japanese Patent Application 2005-312964 dated Aug. 23, 2011. Cited in the Parent, U.S. Appl. No. 12/088,239, filed Mar. 26, 2008.

International search report issued in corresponding application No. PCT/JP2006/321249, dated Feb. 6, 2007. Cited in the Parent, U.S. Appl. No. 12/088,239, filed Mar. 26, 2008.

"Voicepoint IP"; Japanese website of NEC Engineering Ltd. Website can be accessed at: http://www.nec-eng.com/pro/vp_ip; Cited in the Parent, U.S. Appl. No. 12/088,239, filed Mar. 26, 2008.

Panasonic Ideas for Life; Speakerphone for Teleconferences: KX-TS730JPS; News release on new product by Panasonic Communications Co., Ltd.; Website can be accessed at: http://panasonic.co.jp/pcc/news/2005/jn050930/jm050930.html. Cited in the Parent, U.S. Appl. No. 12/088,239, filed Mar. 26, 2008.

Chou, Thomas "Frequencey-Independent Beamformer With Low Response Error" dated May 9, 1995. Cited in EESR issued in coressponding EP 06822658.8.

* cited by examiner

AUDIO CONFERENCE DEVICE

TECHNICAL FIELD

The present invention relates to audio signal transmission/reception devices, generally known as audio conference devices, equipped with speakers, microphones, and operation controls, which are applied to audio signal transmission/reception systems enabling transmission and reception of audio signals between multiple audio signal transmission/reception devices.

The present application claims priority on Japanese Patent Application No. 2005-312964 filed in Japan on Oct. 27, 2005, the content of which is incorporated herein by reference.

BACKGROUND ART

Figure 7:
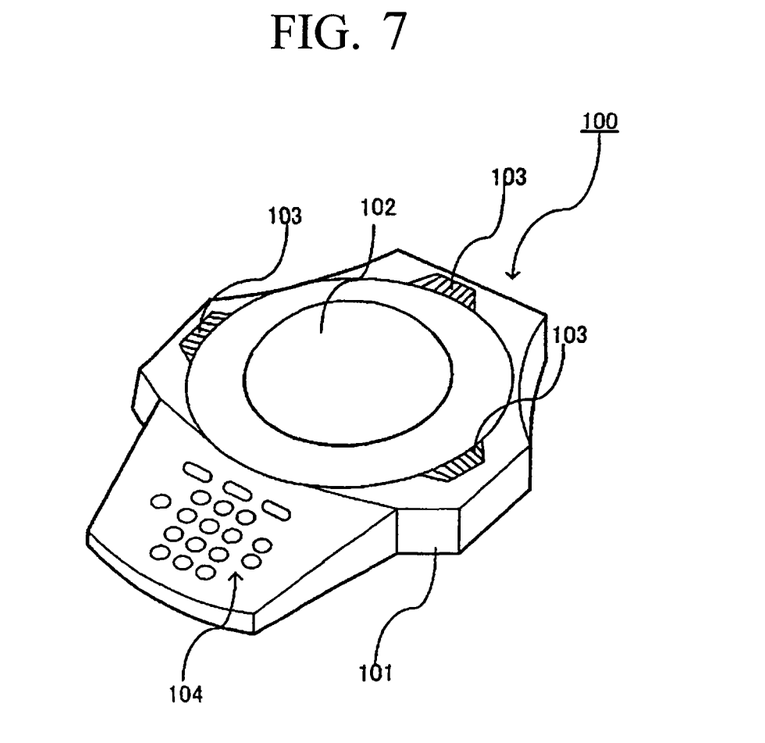
FIG. 7 is a perspective view showing the exterior appearance of a conventionally-known audio signal transmission/reception device.

Conventionally, audio signal transmission/reception devices equipped with microphones, speakers, and operation controls have been known, wherein Voicepoint IP shown in Non-Patent Document 1 provided by Nippon Electronic Co. Ltd. (NEC) has been known, for example. FIG. 7 is a perspective view of a conventionally known audio signal transmission/reception device 100. The audio signal transmission/reception device 100 includes a main unit (housing) 101 having a prescribed shape, a speaker 102 mounted on the center of the surface of the main unit 101, a plurality of microphones 103 arranged in the periphery of the speaker 102, and an operation control (console) 104 arranged in the front side of the surface of the main unit 101.

Non-Patent Document 1: Voicepoint IP, NEC (which can be retrieved via the Internet; URL: http://www.nec-eng.com/pro/vp_ip)

The aforementioned audio signal transmission/reception device 100 is applied to an audio signal transmission/reception system including multiple audio signal transmission/reception devices, wherein audio signals converted by the microphones 103 of the audio signal transmission/reception device 100 are transmitted to a counterpart audio signal transmission/reception device and wherein the speaker 102 produces sound based on received audio signals, which are transmitted from the counterpart audio signal transmission/reception device and are received. By arranging the speaker 102 on the surface of the main unit 101, it is possible to arrange the main unit 101 on a desk, thus placing a user's head above the main unit 101.

It allows the user to operate the operation control 104 so as to perform sound reception setups of the microphones 103 and sound emission setups (volumes etc.) of the speaker 102, wherein sound reception setups and sound emission setups can be appropriately changed. The audio signal transmission/reception device 100 is normally arranged on a desk. Hence, the operation control 104 is arranged in the front side of the surface.

The conventionally-known audio signal transmission/reception device 100 is designed so that the speaker 102, the microphones 103, and the operation control 104 are all arranged on the surface of the main unit 101 in consideration of the user operability and sound emission characteristics. For this reason, it is difficult to reduce the size of the main unit 101.

In order to realize hands-free audio signal transmission/reception devices (e.g., telephone devices), it is a recent trend to use speaker arrays having sound emission characteristics of narrow directivities and microphone arrays having sound reception characteristics of narrow directivities. Speaker arrays are each designed to align multiple speakers in order to realize adequate sound emission directivity controls, while microphone arrays are each designed to align multiple microphones in order to realize adequate sound reception directivity controls. For this reason, when a speaker array or a microphone array is applied to the conventionally-known audio signal transmission/reception device 100, the size undesirably increases.

SUMMARY

A present audio conference device makes it possible to reduce the size in comparison with the conventionally-known audio conference device having the operation control and speaker on the upper surface of the main unit. In addition, the present audio conference device has legs supporting its main unit or body at a prescribed height above the mount (i.e., resting) surface for the main unit.

In addition, it is possible to secure good user operability by arranging the operation control on the surface of the main unit.

The main unit can have a substantially elongated rectangular parallelepiped shape, with a microphone array arranged on the side surface of the main unit extending along its longitudinal direction, and at least one connector for establishing a connection with an external device can be arranged on the side surface of the main unit extending along its width direction. Thus, it is possible to reduce the size of the main unit in comparison with the foregoing constitution arranging connectors on the surface of the main unit.

BRIEF DESCRIPTION OF THE DRAWINGS

FIG. 3 (A) is a right side view of the audio signal transmission/reception device in an X-axis section, and (B) is a left side view of the audio signal transmission/reception device in a –X-axis section.

BEST MODE FOR CARRYING OUT THE INVENTION

The preferred embodiment of the present invention will be described in detail with reference to the accompanying drawings.

Figure 1:
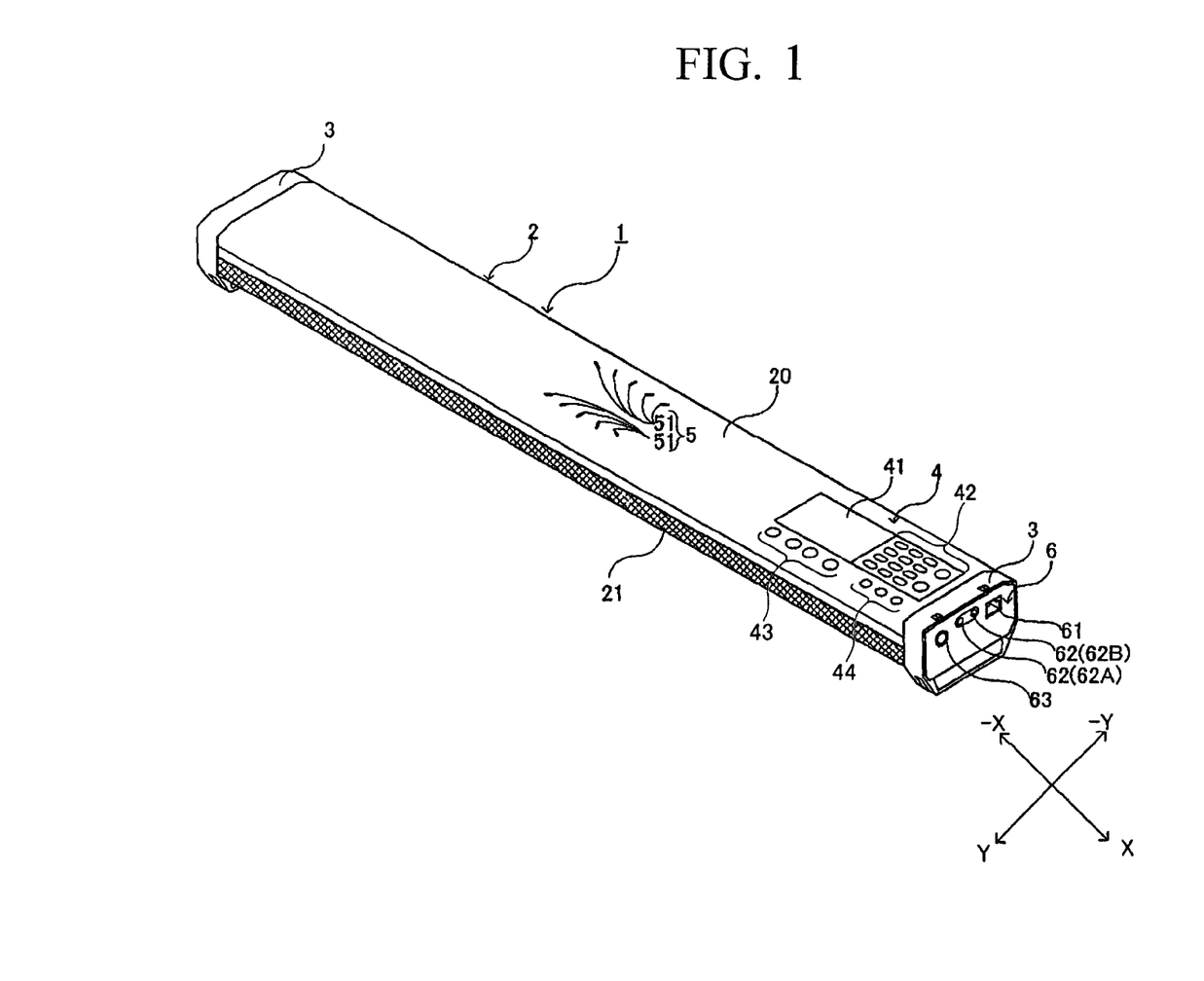
FIG. 1 is a perspective view showing the exterior appearance of an audio signal transmission/reception device in accordance with a preferred embodiment of the present invention.

FIG. 1 is a perspective view showing the exterior appearance of an audio signal transmission/reception device 1, which is generally known as an audio conference device, according to the embodiment of the present invention. The audio signal transmission/reception device 1 is connected to the Internet and LAN (Local Area Network) so as to perform transmission and reception of audio signals with a counterpart audio signal transmission/reception device (not shown) located at a remote place, thus realizing audio conference therebetween.

Figure 2:
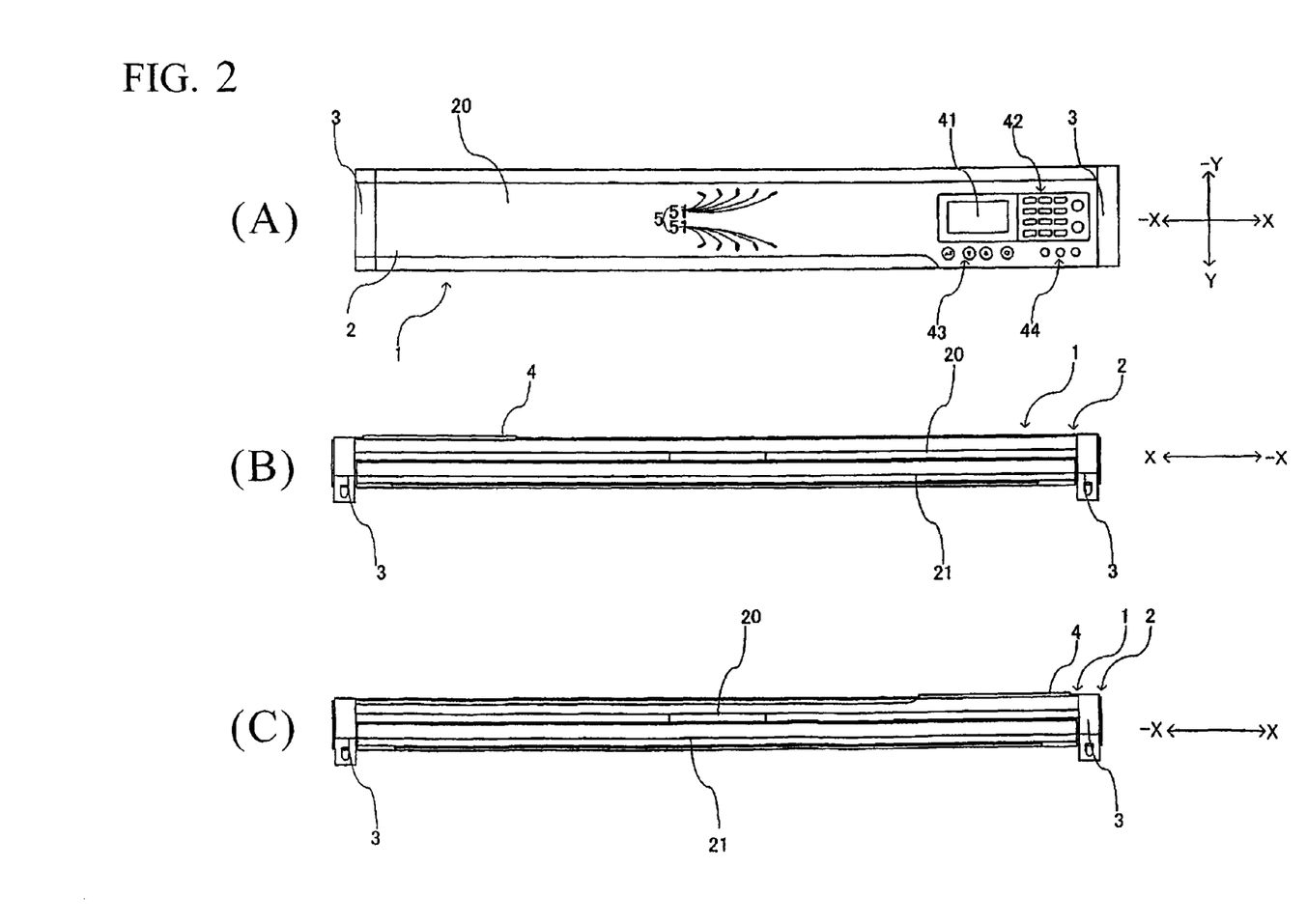
FIG. 2 are views for observing the audio signal transmission/reception device in X-Y axes directions, wherein (A) is a plan view of the audio signal transmission/reception device, (B) is a rear view of the audio signal transmission/reception device in a –Y-axis section, and (C) is a front view of the audio signal transmission/reception device in a Y-axis section.
Figure 3:
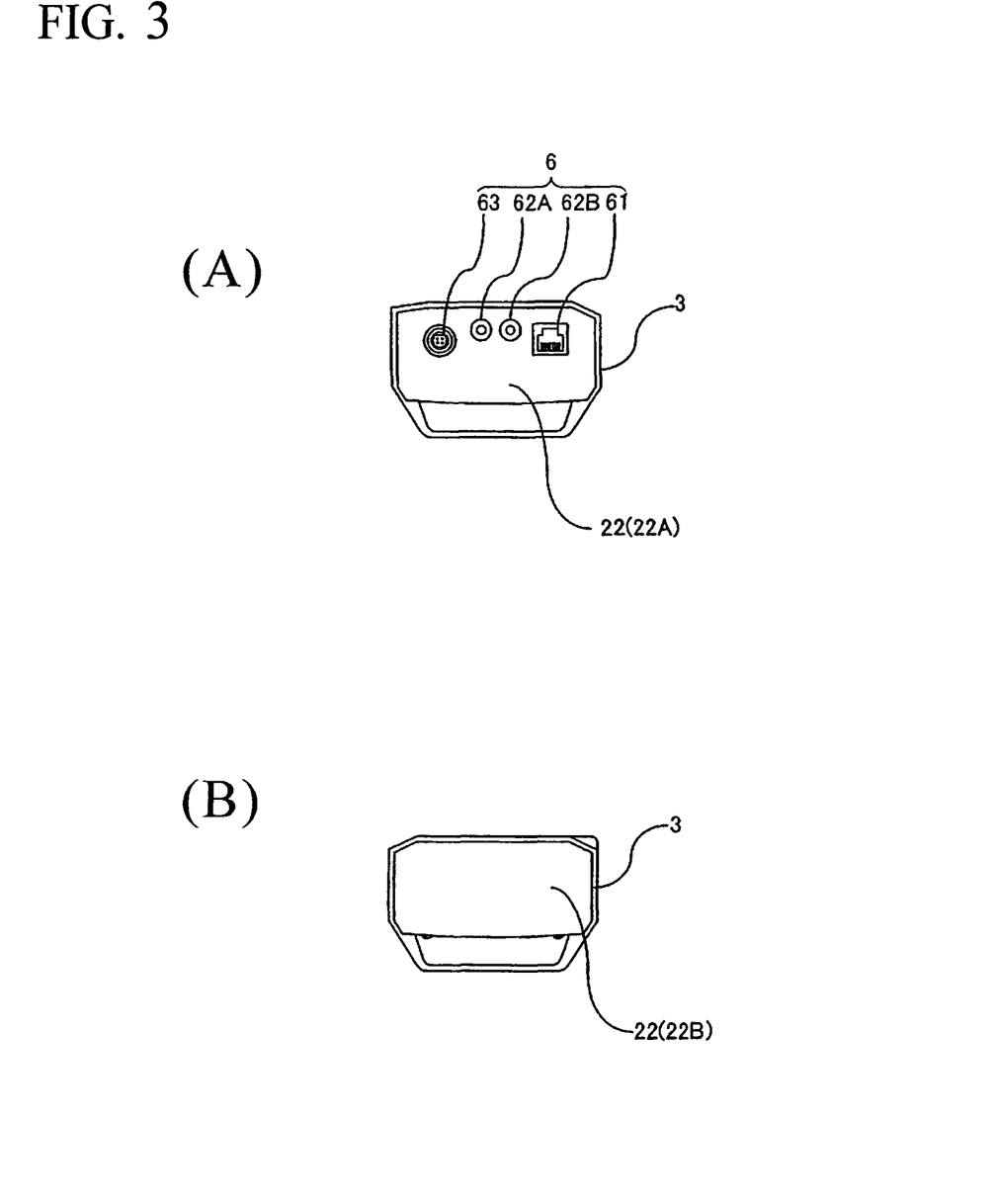

In FIG. 1, the front side of the audio signal transmission/reception device 1 is denoted as a Y-axis section, the rear side is denoted as a −Y-axis section, the right side is denoted as an X-axis section, and the left side is denoted as a −X-axis section. FIG. 2(A) is a plan view of the audio signal transmission/reception device 1; FIG. 2(B) is a rear view of the audio signal transmission/reception device 1 in the −Y-axis section; and FIG. 2(C) is a front view of the audio signal transmission/reception device 1 in the Y-axis section. FIG. 3(A) is a right side view of the audio signal transmission/reception device 1 in the X-axis section, and FIG. 3(B) is a left side view of the audio signal transmission/reception device in the −X-axis section.

The audio signal transmission/reception device 1 is formed using a main unit 2 having an elongated rectangular parallelepiped shape, which is supported at a prescribed height above the surface (e.g., the surface of a desk) by means of legs 3 having U-shapes that are engaged externally with both sides thereof. The main unit 2 is constituted by an upper panel 20, a lower grill 21, and a pair of side panels 22 (i.e., 22A, 22B) and is also equipped with an elongated speaker device 23 (see FIG. 5) having a speaker array 231 (see FIG. 4) therein and two series of microphone arrays 24 (see FIG. 5).

Figure 4:
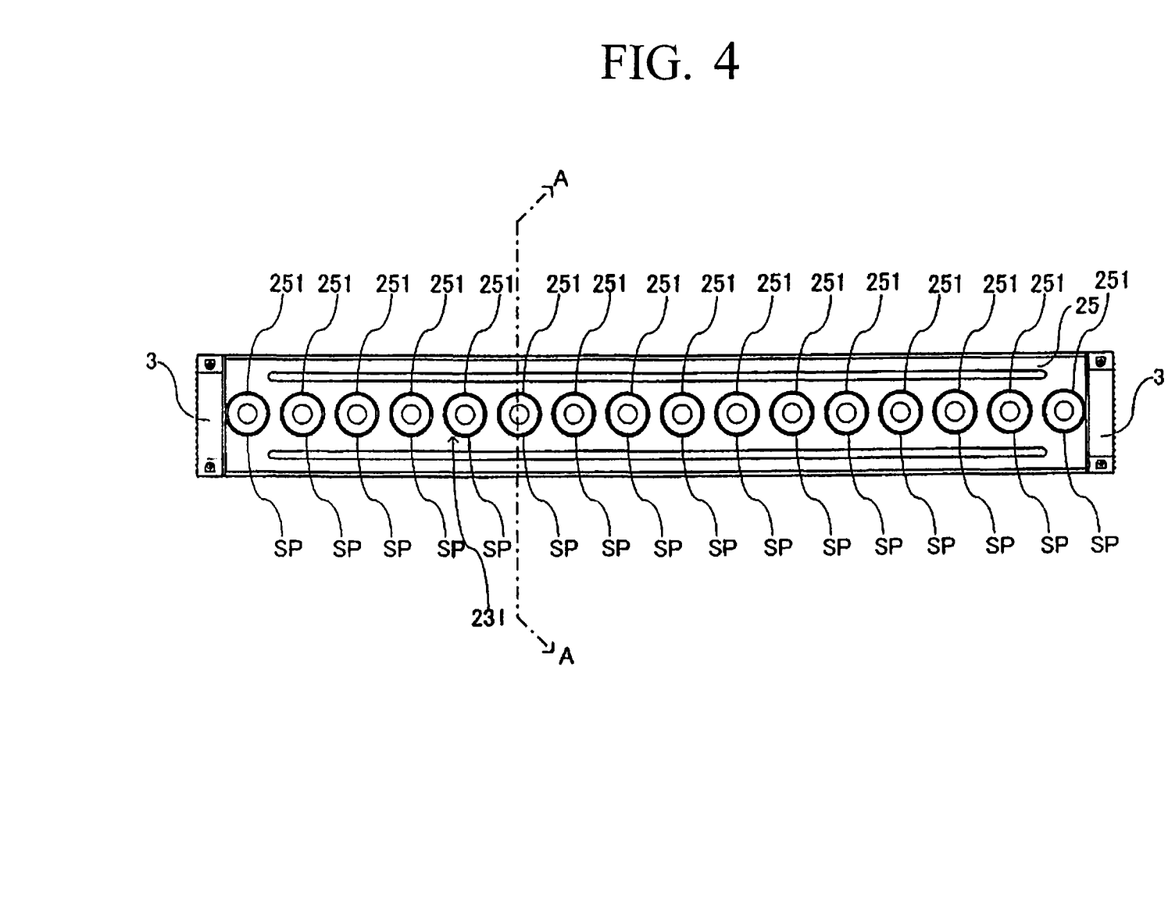
FIG. 4 is a bottom view showing the audio signal transmission/reception device excluding a lower grill, in which a speaker array including multiple speakers is arranged.
Figure 5:
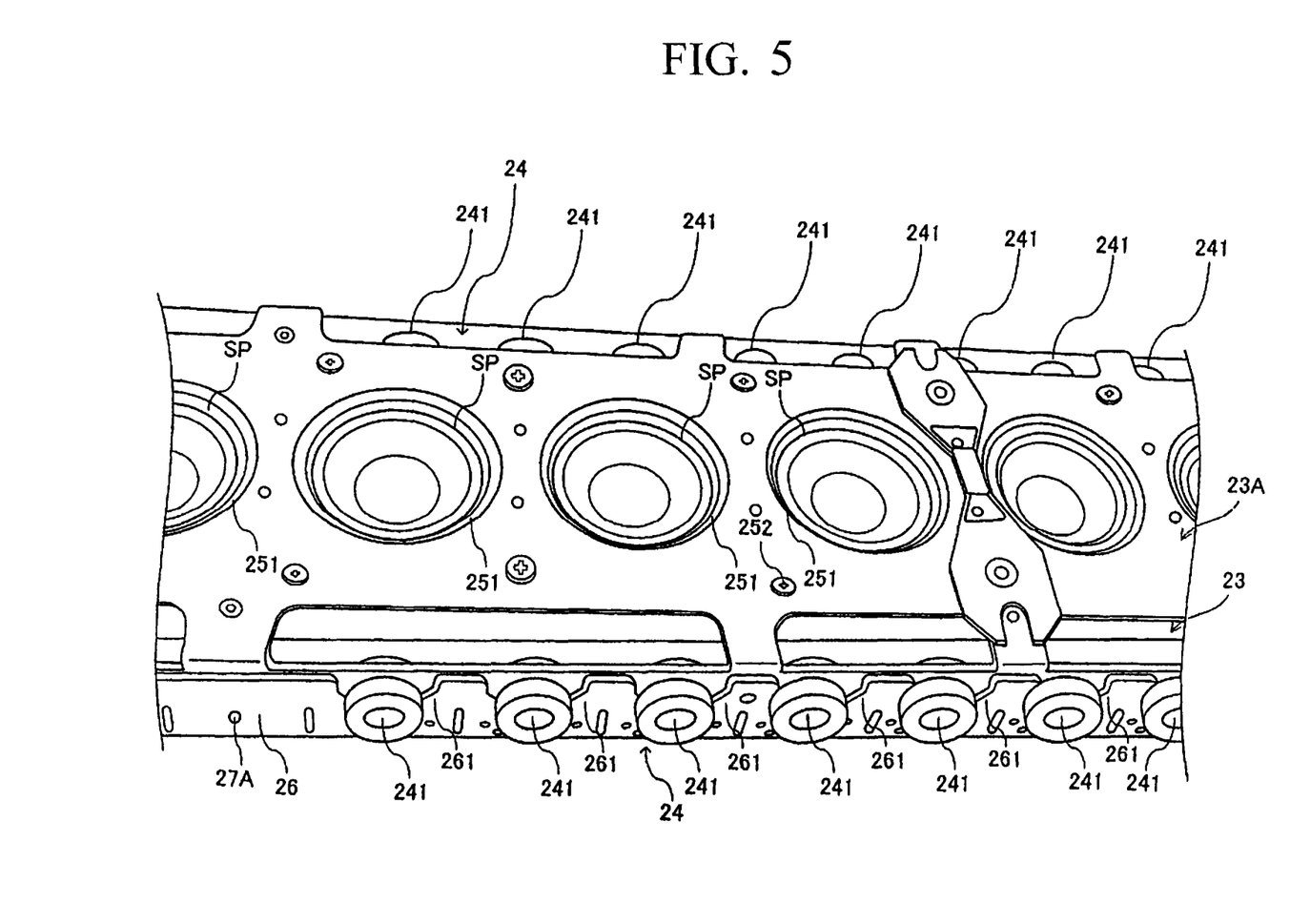
FIG. 5 is an enlarged perspective view showing the audio signal transmission/reception device excluding the lower grill, which corresponds to the bottom view shown in FIG. 4.

The speaker array 231 is linearly aligned in the lower portion of the speaker device 23 in its longitudinal direction, and the microphone arrays 24 are linearly aligned on both sides of the speaker device 23 in its longitudinal direction. Detailed constitutions of the speaker device 23, the speaker array 231, and the microphone arrays 24 will be described later.

The upper panel and the side panels 22 are composed of a resin, and cover the internal structure including the speaker array 231 and the microphone arrays 24. The upper panel 20 has an elongated U-shape in cross section, while the side panels 22 have substantially planar shapes. The lower grill 21 has a U-shape in cross section so as not to disturb sound emission of the speaker array 231 and sound reception of the microphone arrays 24, wherein it is formed using a punch-mesh steel plate.

The operation control 4 is formed in the X-axis section of the upper panel 20, and the LED display 5 is formed in the center portion. As shown in FIG. 2(A), the operation control 4 includes an LCD (Liquid Crystal Display) 41 for displaying setups and operation keys 42 such as a ten-key unit. The operation keys 42 are used, for example, for communication control.

In the operation control 4, the LCD 41 and the operation keys 42 are arranged in parallel in the X-axis section, and other operation keys 43 and 44 are arranged in parallel in the Y-axis section. The operation keys 43 designate ups and downs of volume and mute, while the operation keys 44 are used to change the setup of the audio signal transmission/reception device 1. The audio signal transmission/reception device 1 has two setup modes, wherein, for example, it allows the user to select one of the first and second modes.

In the aforementioned operation control 4, the LCD 41 and the operation keys 42, 43, and 44 are arranged in the Y-axis section (i.e., the front side viewed from the user) so as to allow them to be easily recognized. This makes it possible for the user to easily operate and recognize the audio signal transmission/reception device 1.

The LED display 5 linearly arranges two series of LEDs 51, wherein five LEDs are aligned in the −Y-axis section, and five LEDs are aligned in the Y-axis section. In each series, multiple LEDs 51 are aligned in a radial manner extending from the −X-axis section to the X-axis section. The LEDs 51 are each independently controlled by a lighting control section (not shown) arranged inside of the upper panel 20. Specifically, when the user operates the operation keys 44 to set up the first mode, multiple LEDs 51 are appropriately turned on so as to designate the directivity of a sound beam emitted from the speaker array 231. That is, the user can visually recognize the directivity of a sound beam emitted from the speaker array 231 based on the lighting state of the LEDs 51.

When the user operates the operation keys 44 to set up the second mode, multiple LEDs 51 are appropriately turned on so as to designate the sound reception directivity of the microphone arrays 24. Since two series of microphone arrays 24 are installed in the main unit 2 of the audio signal transmission/reception device 1, the LEDs 51 aligned in the Y-axis section are turned on so as to designate the sound reception directivity of the microphone array 24 of the Y-axis section, while the LEDs 51 aligned in the −Y-axis section are turned on so as to designate the sound reception directivity of the microphone array 24 of the −Y-axis section. Thus, the user is capable of recognizing the manner of sound reception by way of the LED display 5, whereby the user can recognize the sound reception directivities regarding two series of microphone arrays 24 by observing lighting states of two series of LEDs 51.

The audio signal transmission/reception device 1 of the present embodiment controls the sound reception directivity with respect to plural regions surrounding it, wherein it has a function to detect the position of talker based on sound reception levels of regions. Thus, the user can recognize whether the position of a talker is erroneously detected in the second mode.

The LEDs 51 are controlled to vary in lighting manners thereof in response to volumes of received sound and emitted sound in the LED display 5. This makes it possible for the user to recognize whether sound reception and sound emission are achieved with an adequate volume.

As shown in FIG. 3(A), the connectors 6 for establishing connection with an external device (not shown) are arranged in the side panel 22A of the X-axis section. As the connectors 6, there are provided a modular jack 61 connected with a LAN such as the Ethernet (registered trademark) or a network such as the Internet; an audio input terminal 62A and an audio output terminal 62B connected with an audio device; and a power terminal 63 connected with a power source.

Inserting the plug of a modular cable (not shown) into the modular jack makes it possible to connect the audio signal transmission/reception device 1 to a network. When the audio signal transmission/reception device 1 is connected to the network, it can be communicated with a counterpart audio signal transmission/reception device, thus making it possible to perform conversation and audio conference. Thus, it is possible to use the audio signal transmission/reception device 1 as an IP telephone device and an audio conference device.

In the present embodiment, connectors are arranged in the side panel 22A in a concentrated manner. This makes it possible to compactly design the audio signal transmission/reception device 1 of the present embodiment in comparison with the foregoing audio signal transmission/reception device in which connectors are arranged on the upper surface.

Figure 6:
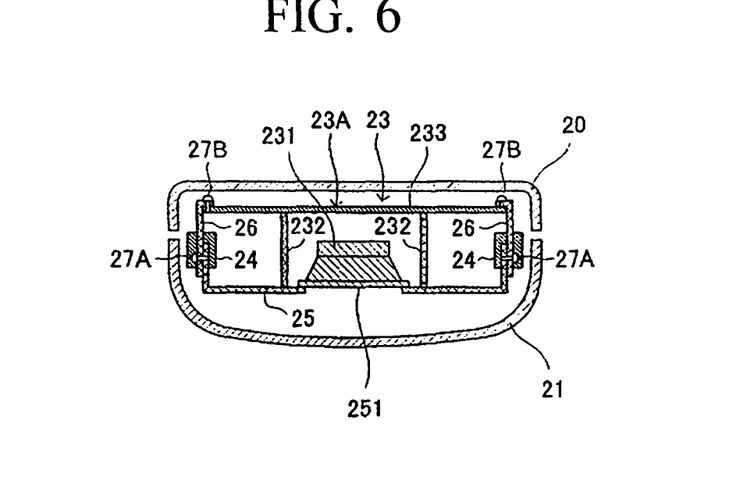
FIG. 6 is a cross-sectional view of the audio signal transmission/reception device shown in FIG. 4 taken along line A-A.

FIG. 4 is a bottom view of the audio signal transmission/reception device 1 excluding the lower grill 21, and FIG. 5 is an enlarged perspective view of the audio signal transmission/reception device 1. FIG. 6 is a cross-sectional view of the audio signal transmission/reception device 1 shown in FIG. 4 taken along line A-A.

The speaker array 231 and the microphone arrays 24 are attached to the frame 25 serving as a baffle of the speaker array 231. The frame 25 is a box-like member, which is formed by bending four corners of a rectangular metal plate upwards. The speaker array 231 is attached inside of the bottom of the frame 25 to direct downwardly, while the microphone arrays 24 are arranged on both sides of the frame.

The lower end of an elongated cylindrical frame member 232 covering the sides of the speaker array 231 is arranged in the upper section of the frame 25. A top board 233 having substantially the same dimensions as the bottom of the frame 25 is arranged in the upper end of the frame member 232 so as to cover the rear of the speaker array 231.

Support plates 26 each composed of a metal plate upwardly extended are attached to the sides of the frame 25 (i.e., bent portions lying in the longitudinal direction) via screws 27A, wherein the upper ends of the support plates 26 are bent inward. The bent portions of the support plates 26 are attached to terminal portions of the top board 233 in its width direction via screws 27B. That is, the frame member 232 is held between the top board 233 and the bottom of the frame 25.

As described above, a housing 23A of the speaker array 231 is formed and surrounded by the frame 25, the top board 233, and the cylindrical frame member 232. A printed circuit board (not shown) mounting a control unit (not shown) for performing directivity control on the speaker array 231 and the microphone arrays 24 is attached to the surface of the housing 23A (i.e., the surface of the top board 233). The speaker device 23 is constituted by the control unit, the housing 23A, and the speaker array 231.

A plurality of speaker units SP (e.g., sixteen speakers SP) are linearly and uniformly aligned in the speaker array 231. A plurality of holes 251 are formed in the bottom of the frame 25 in conformity with alignment positions of the speaker units SP. Each hole has the same dimensions as the internal diameter of each speaker unit SP. In this condition, the speaker array 231 is attached to the bottom of the frame 25 via screws 252. That is, the sound emission side of the speaker array 231 is arranged in the bottom of the frame 25, from which sounds of the speaker units SP are emitted.

In the present embodiment, the speaker array 231 is arranged on the bottom of the audio signal transmission/reception device 1, and the operation control 4 and the LED display 5 are arranged in prescribed regions achieving good operability in view of the user (i.e., the upper surface of the audio signal transmission/reception device 1). That is, the audio signal transmission/reception device 1 is compactly designed such that the operation control 4, the LED display 5, and the speaker array 231 are compactly arranged in a three-dimensional manner. A sound beam emitted from the speaker array 231 is emitted downwardly from the audio signal transmission/reception device 1, wherein the audio signal transmission/reception device 1 is supported at a prescribed height above the mount surface (e.g., the surface of a desk) by means of the legs 3, so that the sound beam is reflected off the mount surface so as to slantingly propagate upwards. Thus, it is possible to transmit a sound beam toward the user with an efficiency similar to that realized by the audio signal transmission/reception device 1 arranging the speaker array 231 on the lower surface thereof.

Since the legs 3 have hollow structures, it is possible to transmit sound toward the user without disturbing sound emission of the speaker array 231 and reflection on the mount surface.

The control unit delays audio signals, which are inputted thereto via the modular jack 61 from the counterpart audio signal transmission/reception device so as to control the directivity of a sound beam emitted from the speaker array 231. Audio signals from the counterpart audio signal transmission/reception device are subjected to D/A conversion and amplification and are then supplied to the speaker array 231.

The microphone arrays 24 includes two series of microphones 241 (each series includes sixteen microphones 241, for example), which are linearly aligned on both sides of the frame 25 along its longitudinal direction. A plurality of microphones 241 can be aligned in a non-uniform manner such that the density thereof increases in the inside of the frame 25; this makes it possible to efficiently receive high-frequency sound having high directivity.

The microphone arrays 24 are supported on both sides of the frame 25 by means of the support plates 26 forming cutouts 261 at positions of the microphones 241, wherein the support plates 26 are fixed to both sides of the frame 25 via screws such that the microphones 241 are put into the cutouts 261.

In the present embodiment, two series of microphone arrays 24 are arranged on both sides of the speaker device 23, i.e. on both sides of the audio signal transmission/reception device 1. Thus, the operation control 4 and the LED display 5 can be arranged only on the upper surface of the audio signal transmission/reception device 1. Thus, it is possible to compactly design the audio signal transmission/reception device 1 in a three-dimensional manner. In other words, it is possible to reduce the size of the audio signal transmission/reception device 1 of the present embodiment compared with the foregoing constitution in which the speaker array and microphone array are arranged on the upper surface of the audio signal transmission/reception device. In addition, the connectors 6 are arranged on the side surface, which differs from the side portions for arranging the microphone arrays 24, in the audio signal transmission/reception device 1, which can be thus reduced in size.

The microphone arrays 24 are connected to the control unit via signal lines (not shown); hence, audio signals converted by the microphones 241 are supplied to the control unit. In the control unit, audio signals are appropriately delayed, thus performing directivity control on sound beams. Then, audio signals are transmitted to the counterpart audio signal transmission/reception device via the module jack 61 and modular cable (not shown).

According to the present embodiment described above, the speaker array 231 is arranged on the lower surface of the audio signal transmission/reception device 1; this allows the operation control 4 and the LED display 5 to be arranged on the upper surface, which provides good operability and good visual recognizability for the user; hence, it is possible to compactly design the audio signal transmission/reception device 1. Since the audio signal transmission/reception device 1 is supported by the legs 3 at a prescribed height from the surface, it is possible to determine the directivity in which a sound beam emitted from the speaker array 231 is reflected on the surface so as to slantingly propagate upwards. Thus, as similar to the foregoing constitution in which the speaker array is arranged on the surface of the audio signal transmission/reception device, it is possible for the audio signal transmission/reception device 1 of the present embodiment to emit a sound beam directed to the user.

The present embodiment provides the compact audio signal transmission/reception device 1 that secures good user operability and that can efficiently emit sound to the user.

Furthermore, two series of microphone arrays 24 are aligned on both sides of the audio signal transmission/reception device 1 in its longitudinal direction, and the connectors 6 are collectively arranged in one terminal surface of the audio signal transmission/reception device 1. This allows the operation control 4 and the LED display 5 to be arranged on only the upper surface of the audio signal transmission/reception device 1; thus, it is possible to design the audio signal transmission/reception device 1 in a further compact manner. Since the microphone arrays 24 and the connectors 6 are independently arranged in different sides of the audio signal transmission/reception device 1, it is possible to further reduce the size of the audio signal transmission/reception device 1.

Since the speaker array 231 is arranged on the lower surface of the audio signal transmission/reception device 1 and the microphone arrays 24 are arranged on both sides of the audio signal transmission/reception device 1, it is possible to effectively prevent dust from entering into the inside of the audio signal transmission/reception device 1 via holes of a punch mesh member, and it is possible to effectively prevent dust from being attached to the lower surface of the speaker device 23 or the support plates 26.

The present invention is applicable to the audio signal transmission/reception system realizing audio conferences in the enterprise or between distanced places.

It is an object of the present invention to improve user operability and sound reception/emission characteristics and to provide an audio signal transmission/reception device whose size can be reduced even when a speaker array and a microphone array is applied thereto.

The present audio conference device has a main unit/body, a speaker array having a plurality of speaker units, and legs supporting the main unit, with the speaker array arranged on the lower surface of the main unit so that the sound emission side thereof is positioned at a prescribed height above the mount/resting surface of the main unit.

Since the speaker array is arranged on the lower surface of the main unit, it is possible to arrange the operation control and the speaker array relative to the main unit in a three-dimensional manner. Hence, it is possible to reduce the size compared with the conventionally-known audio conference device arranging the operation control and speaker on the upper surface of the main unit. In addition, since the main unit is supported by legs at a prescribed height above the mount surface for the main unit, sound beams can be emitted downwardly from the speaker array and reflected by the surface (e.g., the surface of a desk) so as to slantingly propagate upwards. Thus, it is possible to secure sound emission characteristics similar to those of the foregoing constitution arranging the speaker array on the surface of the main unit.

In addition, it is possible to secure good user operability by arranging the operation control on the surface of the main unit.

Furthermore, it is possible to arrange a microphone array for aligning multiple microphones in the side surface of the main unit. Thus, it is possible to efficiently receive sound at the side portion of the main unit and to reduce the size of the main unit in comparison with the foregoing constitution arranging microphones on the surface of the main unit.

The main unit of the aforementioned audio conference device can have a substantially elongated rectangular parallelepiped shape, with the microphone array arranged on the side surface of the main unit extending along its longitudinal direction, and at least one connector for establishing a connection with an external device arranged on the side surface of the main unit extending along its width direction. Thus, it is possible to reduce the size of the main unit in comparison with the foregoing constitution arranging connectors on the surface of the main unit.

By making the aforementioned legs have hollow structures, it is possible to effectively prevent the directivity of a sound beam emitted from the speaker array from being changed by the legs. Thus, it is possible to effectively prevent sound emission characteristics of the speaker array and reflection characteristics on the surface from being changed by the legs.

The present audio conference device is designed so that the speaker array is arranged on the lower surface of the main unit, the microphone array is arranged on the side surface of the main unit, and the operation control is arranged on the surface of the main unit. Hence, it is possible to reduce the size of the main unit, and it is possible to secure good sound emission characteristics and sound reception characteristics.

DESCRIPTION OF REFERENCE NUMERALS 1 audio signal transmission/reception device
2 main unit
3 leg
4 operation control
5 LED display
6 connectors
23 speaker device
24 microphone array
25 frame
26 support board
41 LCD
42 operation keys
43 operation keys
44 operation keys
51 LED
61 modular jack
62A audio input terminal
62B audio output terminal
63 power terminal
231 speaker array
241 microphone
SP speaker unit

What is claimed is:

1. An audio conference device connectible to an external device via a network, the audio conference device comprising:
a main housing having an elongated rectangular parallelepiped shape;
a plurality of microphones linearly aligned along a longitudinal direction of the main housing;
a plurality of legs disposed at opposite ends of the main housing to support the main housing above a predetermined height from a surface on which the audio conference device rests; and
a connector that connects to the network;
wherein the audio conference device controls a plurality of signals output from the plurality of microphones to control directivity of the plurality of microphones and then transmits the plurality of signals to the external device via the connector.

2. The audio conference device according to claim 1, wherein the audio conference device controls sound reception directivity with respect to a plurality of regions to detect a position of a sound source based on sound reception levels of the plurality of regions.

3. The audio conference device according to claim 2, further comprising:
a lighting unit disposed on an upper face of the main housing, wherein the lighting unit includes a plurality of light-emitting members, which are turned on to emit light indicating the direction of the detected position of the sound source.

4. The audio conference device according to claim 2, wherein the plurality of microphones are spaced non-uniformly along the longitudinal direction of the main housing.

5. The audio conference device according to claim 4, wherein an operation control is arranged at an end portion on an upper surface of the main housing.

6. The audio conference device according to claim 5, wherein the operation control provides a mute function.

7. The audio conference device according to claim 1, further comprising:
a plurality of speakers; and
a control unit that performing directivity control of the plurality of microphones and the plurality of speakers,
wherein the control unit control directivity for each signal output from each microphone, and
wherein the control unit controls directivity of an external signal, which is input from the external device via the connector, and then supplies the external signal to each speaker.

* * * * *